(No Model.)
E. SHAW.
HITCHING STRAP.
No. 498,035. Patented May 23, 1893.
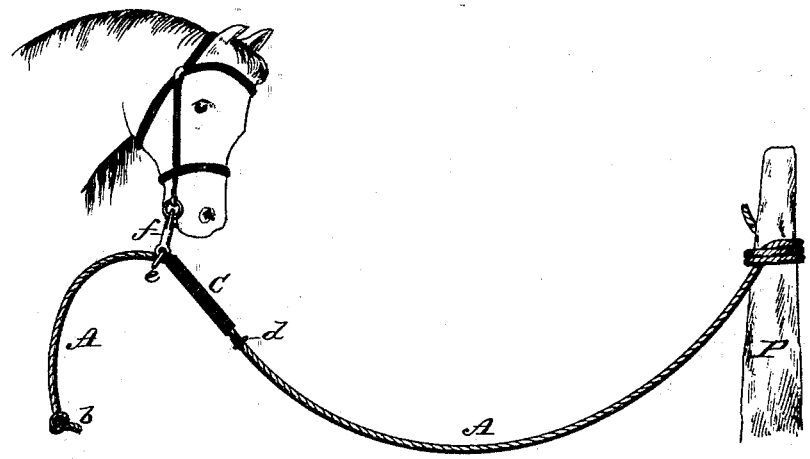
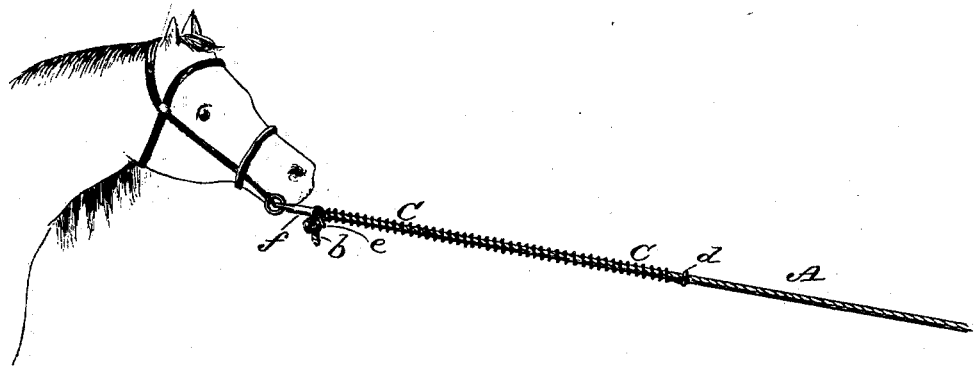
Witnesses:
D. N. Hayward
Gy. E. Croxton
Inventor
Edgar Shaw
By Attorney
J. N. McIntire

UNITED STATES PATENT OFFICE.

EDGAR SHAW, OF SWAMPSCOTT, MASSACHUSETTS.

HITCHING-STRAP.

SPECIFICATION forming part of Letters Patent No. 498,035, dated May 23, 1893.

Application filed February 11, 1893. Serial No. 461,906. (No model.)

*To all whom it may concern:*

Be it known that I, EDGAR SHAW, of Swampscott, in the county of Essex and State of Massachusetts, have invented a certain new and useful Improvement in Halters and Hitch-Ropes; and I do hereby declare that the following is a full, clear, and exact description of the same, reference being had to the accompanying drawings, forming part of this specification.

My present invention relates to distensible hitch-ropes, to be used either in connection with a halter, or harness head-gear, for hitching a horse, or other animal, either when in the stall, or to a hitch post; and it has for its main objects to provide for use a device for these purposes which, while it shall possess, in an eminent degree, the distensible, and the automatic contractile features of hitch-ropes and straps heretofore devised, will be exceedingly simple and economic of manufacture; perfectly efficient and reliable in action; and involve not the slightest liability in its use of any entanglement of the animal's fore legs in any duplex, or loop-like portion of the hitch-rope.

To these main ends and objects my invention may be said to consist, essentially, in a distensible and self-contractile hitch-rope, or strap, composed of a suitable cable, or strap, formed, or provided, with a stop at, or near, one end; and a coiled, or other spring having one end attached to said cable, or strap, and provided at its other end with a suitable hook, or catch, adapted to engage a halter, or harness, ring; the said cable and spring being combined so that when the latter shall have been completely distended, by a draft strain on the former, the cable and spring will come to a dead-lock and the draft strain be then borne wholly by the cable; all as will be hereinafter more fully explained and as will be more particularly pointed out in the claim of this specification.

To enable those skilled in the art to which my invention relates to make and use hitch-ropes containing my invention, I will now proceed to more fully explain the same, referring by letters to the accompanying drawings which form part of this specification, and in which I have shown my invention carried out in that precise form under which I have, so far, successfully practiced it.

In the drawings, Figure 1, is a view showing in elevation part of a hitch-post; the head of a horse; and one of my improved hitch-ropes, by which the horse's head is hitched up to the post. Fig. 2, is an elevation of the horse's head and attached hitch-ropes; but with the post and a contiguous portion of the rope broken away, and showing the hitch-rope fully distended.

In both figures the same part, wherever duplicated in the views, will be found designated by the same letter of reference.

My improved device, or contrivance, in the form in which I have shown it in the drawings, is composed, it will be seen, wholly of a single rope A, having a knot $b$ at one end; and a spiral spring C, which encircles the rope A, is made fast at one end, to said rope, and is provided with a snap-hook $f$ adapted to engage with the ring of either a halter, or harness, on the head of the horse; all as plainly illustrated in the drawings. By preference, that end of the spiral spring C that is coupled fast to the rope A, is fastened to the latter by means of a metallic, or wire, eye, or loop-ring, $d$, which is fastened by compression to the rope A, and to which one end of the coiled wire composing spring C is made fast.

$e$ is a ring hung in the perforated end of the snap-hook $f$, and of sufficient size to permit the passage, easily, through it of the rope A; while with the said perforated end of said snap-hook, is also permanently engaged the outer end of the said coiled wire, composing spring C.

The conjoint action of these combined parts, or the operation of the hitching device, in use, is as follows:—Supposing a horse to be hitched to a post, or to a fixture in his stall, for instance, with a proper, or desirable, slack, or amount of rope let out, as shown in Fig. 1, the combined cable and spiral spring maintain the normal relationship, or condition, illustrated at Fig. 1, in which, as seen, that portion of the rope A which protrudes through and projects beyond ring $e$ is in a state of disuse. Whenever the horse exerts a sufficient draft strain on the rope, by moving bodily, or by moving his head, away from the fixture to which he is hitched, then the spring C is distended, or stretched out, into the condition seen at Fig. 2, and the loose end of rope A, sliding within the coils of said spring, (or, in other words, the rope and spring moving with a sort of telescopic relative movement,) the knot, or stop, $b$ at the free end of the rope, is pulled into contact with the ring $e$ and, thereafter, any further strain is sustained wholly by the rope A which is now strained taut between its point of attachment (at one end) to post P, and the point of the engagement (at its other end) between the knot $b$, and the ring, or eye, $e$ that is coupled to the snap hook $f$, on which the head-gear, or halter of the horse pulls directly.

Of course, some other form of stop $b$ may be used; but the knot shown is simple, cheap and effective; and in lieu of the usual rope-ring $d$ fastened by compression on rope A, as a means for securing to the latter one end of spring C, some other device may be employed without materially changing the combination of devices constituting the pith of my invention.

Although I have, so far, used the coiled, or spiral metallic spring C, and prefer it to any other kind, the novel action due to and the desirable results of, the contrivance involving my invention, may be attained by the use of some other sort of spring *per se*, as, for instance, a tubular rubber spring.

It will be observed that in a hitch-rope device such as shown and described, there is never any duplex portion which, while the rope is slack, can get into a loop-like condition, and permit the entanglement therewith of an animal's foot, or leg, and this is, in practice, an important feature of my improved device.

As there need be but one compression ring, or rope-fastening device (*i. e.* the one at $d$), the structure, and cost of manufacture, of the article shown and described are exceedingly simple and economic, as compared with all other distensible and automatically contractile hitch ropes, that I know of.

At the same time, my improved device, I have found in practice, to be perfectly safe, efficient and durable.

Having now so fully explained the construction and operation of my improved device for hitching animals that any one skilled in the art can make and use devices containing my invention carried out in either the precise form shown or under some modification, what I claim as new, and desire to secure by Letters Patent, is—

A distensible and automatically contractile hitch-rope, or strap, composed of a rope, or strap, provided with a stop at one end; and a spring mounted on said rope, or strap end provided at one end with an engaging hook, through the ring of which said rope moves, and having its other end fastened to said rope; all substantially in the manner and for the purpose set forth.

In witness whereof I have hereunto set my hand this 10th day of February, 1893.

EDGAR SHAW.

In presence of—
HOFFMANN BEACH,
M. E. FOXTEN.